H. J. BUTLER.
MUD DEFLECTOR.
APPLICATION FILED FEB. 4, 1916.
1,220,494.
Patented Mar. 27, 1917.
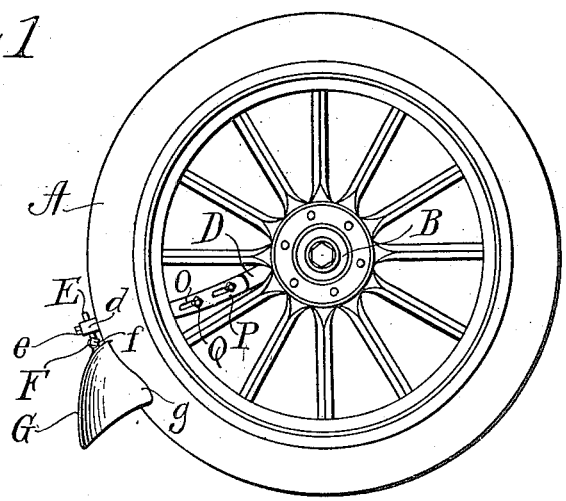
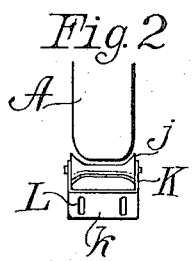
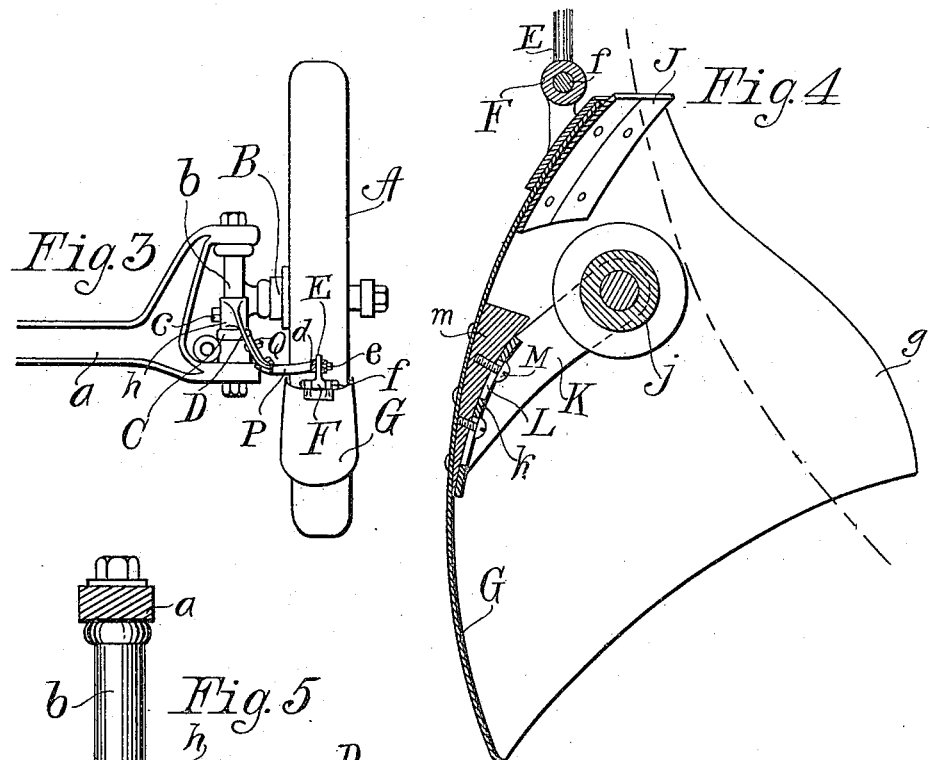
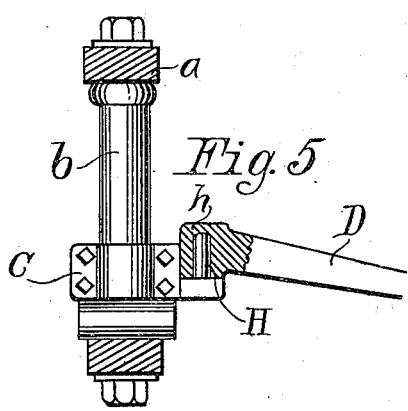
Inventor
Harry J. Butler,
By Edwin Guthrie,
Attorney.

UNITED STATES PATENT OFFICE.

HARRY J. BUTLER, OF BROCKPORT, NEW YORK.

MUD-DEFLECTOR.

1,220,494.  Specification of Letters Patent.  Patented Mar. 27, 1917.

Application filed February 4, 1916. Serial No. 76,200.

*To all whom it may concern:*

Be it known that I, HARRY J. BUTLER, a citizen of the United States, residing at Brockport, in the county of Monroe and State of New York, have invented certain new and useful Improvements in Mud-Deflectors, of which the following is a specification.

This invention relates to mud and dirt deflectors intended for use upon automobile vehicles, and in addition to the customary dust guards usually arranged over the wheels and with which such motor vehicles are ordinarily provided.

This invention comprises a hollow mud deflector arranged adjacent to the periphery of the wheel and relatively near the ground as compared with the regular mud and dust guards. In this invention the mud deflector is held by a swinging arm suitably supported by the axle or near part of the vehicle whereby the deflector may be moved toward and from the periphery of the wheel. The mud deflector is adjustable up and down with respect to the arm, and means are provided for securing the arm upon its support in any predetermined position. The mud deflector is also adjustable toward and from the tread of the wheel while the arm remains fixed, and the deflector bears within it a roller which is provided with means whereby it may be adjusted toward and from the tread of the wheel while the deflector remains at rest. The object and function of the roller is to break up the tangential currents of air, mud, gravel, etc., causing them to be deflected and thrown toward the surface of the roadway, and, at the same time, the roller operates to prevent the interior of the deflector from becoming packed with the matter entering it.

The construction and arrangement of the parts of this invention are illustrated in the accompanying drawings, of which Figure 1 represents a side view of a wheel with this invention applied thereto. Fig. 2 represents a top plan view of the roller and its bearing detached, showing the form of the roller which is carried internally by the deflector. Fig. 3 is a rear view of the end of the front axle and wheel of a motor vehicle showing this invention applied thereto. Fig. 4 is an enlarged vertical section of the deflector. Fig. 5 is an enlarged side view of the turning post of the steering knuckle of the front axle showing the bracket clamp and the pintle upon which the swinging arm moves.

Throughout the drawings and description the same letter is used to refer to the same part.

Considering the drawings, the wheel A has its hub B attached in the usual way to the vertical revoluble post or pillar $b$ of the steering knuckle with which the axle $a$ is provided. The bracket clamp C secured to the post $b$ carries the swinging arm D. The free end of the arm D is provided with a vertical sleeve $d$, and through the sleeve passes the vertical post E, secured in the sleeve by means of the set screw $e$. The post E is an integral part of the hinge F, provided with the clamping bolt $f$, and constructed and arranged to pivotally secure the deflector G to the arm.

It will be noted in Fig. 4, that the lower portions of the sides of the deflector are extended. The extended portion in Fig. 4 is referred to by the letter $g$, and, when the deflector is brought near to the tread of the wheel, the extended sides $g$ lie at the sides of the wheel. The extended sides $g$ are designed to prevent the mud and dirt from flying out of the deflector sidewise.

In Fig. 5, it will be seen that the bracket clamp C has a vertical pintle H, and the pintle engages the head $h$ of the arm D. It is believed to be clear that the arm may be swung with the pintle as a pivot, thus bringing the deflector G near to or away from the tread of the wheel A.

In Fig. 4, at the top of the deflector G are shown a number of leather strips J. The strips may be made of any suitable substance other than leather, which is pliable and not metallic. The purpose of the strips is to prevent the passage of dirt between the upper edge of the deflector and the tread of the wheel, and, further, to prevent the metal edge of the deflector from accidentally coming into contact with the rubber tire of the wheel.

Just below the strips J within the deflector is the roller $j$, having the general form shown in Fig. 2, that is to say, it is of greater diameter at the ends than in the middle. The roller $j$ is supported by the arms K that are usually made integrally with a base or back plate $k$. The plate $k$ is provided with vertical slots L, and through the slots pass the screws M into the inclined block $m$, that is attached to the interior wall of the deflector. It will be observed that by reason of the adjustable engagement of the slots and the screws, the roller $j$ may be positioned higher or lower within the deflector, and nearer or farther from the tread of the wheel A.

To provide for wheels of different diameters, in practice it is useful to make the arm D in two parts as shown in Fig. 1, and to form slots O in the lower portion P of the arm. Bolts Q passing through the slots O into the main portion of the arm secure the two portions together so that the arm may be in case of necessity lengthened or shortened to a certain extent. The head $h$ of arm D is secured to bracket C by set-screw $c$.

In explaining the operation of this invention, it is desired to set forth the facts that the arm D may be swung toward and from the tread of the wheel; that the arm may be lengthened or shortened when desired; that the deflector may be raised or lowered with respect to the arm when the arm is at rest; that the deflector may be moved toward and from the tread of the wheel and adjusted in position when the arm is at rest, and that the roller $j$ within the deflector may be adjusted higher or lower, or toward and from the tread of the wheel without disturbing the positions of either the deflector or the arm. Let it be assumed that the deflector is applied to a wheel as illustrated in Fig. 1, and that the wheel is running. It is found that the dirt and mud thrown into the deflector will mostly take the direction toward the roller, which serves to break down the current of air and mud and water, and by its rotation not only prevents the mud and dirt from packing upon the tire, but, also prevents the accumulation of the mud and dirt within the deflector. By the use of this invention there is very much less cleaning to be done from time to time, and that is very conveniently accomplished by swinging the arm D and the deflector with it away from the tread of the wheel.

Having now explained the construction of this invention and the mode of its operation, what I claim is:—

1. In a mud deflector, the combination with a wheel, of a hollow deflector arranged below the center of the wheel with its top edge near the wheel, the body of the deflector sloping outwardly and downwardly from the wheel, and a roller supported within the deflector near the wheel.

2. In a mud deflector, the combination with a wheel, of a hollow deflector arranged below the center of the wheel with its top edge near the wheel, the body of the deflector sloping outwardly and downwardly from the wheel, means for adjusting the deflector bodily toward or from the periphery of the wheel, and a roller supported within the deflector near the wheel.

3. In a mud deflector, the combination with a wheel, of a hollow deflector arranged below the center of the wheel with its top edge near the wheel, the body of the deflector sloping outwardly and downwardly from the wheel, a roller arranged within the deflector near the wheel, and means carried by the deflector for supporting the roller and for adjusting the roller with respect to the wheel.

4. In a mud deflector, the combination with a wheel, of a hollow deflector arranged below the center of the wheel with its top edge near the wheel, the body of the deflector sloping outwardly and downwardly from the wheel, of means for adjusting the deflector bodily up or down with respect to the wheel, and a roller supported within the deflector near the wheel.

In testimony whereof I affix my signature.

HARRY J. BUTLER.